United States Patent [19]

Reale

[11] Patent Number: 5,759,492
[45] Date of Patent: Jun. 2, 1998

[54] END OF LIFE MONITOR FOR A GAS FILTER

[75] Inventor: Louis Reale, Rochester, N.Y.

[73] Assignee: Xerox Corporation, Stamford, Conn.

[21] Appl. No.: 862,009

[22] Filed: May 22, 1997

[51] Int. Cl.⁶ .................................................. G08B 21/00
[52] U.S. Cl. .............................. 422/58; 422/83; 422/87; 422/119; 340/607; 116/208; 116/215; 116/303
[58] Field of Search .......................... 422/58, 83, 87, 422/119; 340/607; 116/208, 215, 303

[56] References Cited

U.S. PATENT DOCUMENTS

| | | | |
|---|---|---|---|
| 4,388,274 | 6/1983 | Rourke et al. | 422/177 |
| 4,421,719 | 12/1983 | Burleige | 422/87 |
| 4,684,380 | 8/1987 | Leichnitz | 422/119 |
| 4,821,671 | 4/1989 | Bogardt | 116/270 |
| 4,939,543 | 7/1990 | Barker | 355/215 |
| 5,128,110 | 7/1992 | Soga et al. | 422/168 |
| 5,151,251 | 9/1992 | Solcia et al. | 422/119 |
| 5,531,180 | 7/1996 | Bianchini | 116/216 |

*Primary Examiner*—Jill Warden
*Assistant Examiner*—Sharidan Carrillo
*Attorney, Agent, or Firm*—Zosan S. Soong

[57] ABSTRACT

An end of life monitor apparatus for a filter that removes an undesirable gas including: (a) an elastic material, which degrades in the presence of the undesirable gas; (b) a support member coupled to the elastic material; and (c) an indicator component movable to a filter end life position, coupled to the elastic material, whereby the elastic material is stretched between the support member and the indicator component, wherein the indicator component is biased to move to the filter end life position but is restrained by the elastic material from moving to the filter end life position, wherein degradation of the elastic material allows the indicator component to move to the filter end life position.

10 Claims, 3 Drawing Sheets

END OF LIFE MONITOR FOR A GAS FILTER

BACKGROUND OF THE INVENTION

This invention relates to a monitor apparatus that indicates when a gas filter should be replaced.

It is known that in the operation of some machines, one or more undesirable gases such as ozone and nitrogen oxides are generated. For example, noxious gases, including ozone and nitrogen oxides, are generated in electrostatographic printing machines as a result of corona discharge. As used herein, the phrase printing machines include printers and copiers. Corona discharge devices are employed in electrostatographic printing machines for the charging or sensitization of the photosensitive member as well as at certain other stations within these machines. The detrimental effects of such noxious gases on machine components and people are well known.

Filters are employed to remove these undesirable gases as illustrated in Soga et al., U.S. Pat. No. 5,128,110; Barker, U.S. Pat. No. 4,939,543; and Rourke et al., U.S. Pat. No. 4,388,274, the disclosures of which are totally incorporated herein by reference. After the filter becomes ineffective by clogging or by using up all the active filtering compounds, the filter will eventually no longer be able to remove the undesirable gas or gases. Unless the ineffective filter is replaced in a timely manner, it will allow undiminished amounts of the undesirable gas to flow out of the machine. The problem is that the user needs to be informed in a timely manner when the filter should be replaced. Thus, there is a need, which the present invention addresses, for simple and cost effective devices to inform the machine user or repair personnel that the filter has reached or is about reach the end of its life.

SUMMARY OF THE INVENTION

The present invention is accomplished in embodiments by providing an end of life monitor apparatus for a filter that removes an undesirable gas comprising:

(a) an elastic material, which degrades in the presence of the undesirable gas;

(b) a support member coupled to the elastic material; and (c) an indicator component movable to a filter end life position, coupled to the elastic material, whereby the elastic material is stretched between the support member and the indicator component, wherein the indicator component is biased to move to the filter end life position but is restrained by the elastic material from moving to the filter end life position, wherein degradation of the elastic material allows the indicator component to move to the filter end life position.

BRIEF DESCRIPTION OF THE DRAWINGS

Other aspects of the present invention will become apparent as the following description proceeds and upon reference to the Figures which represent preferred embodiments.

Unless otherwise noted, the same reference numeral in different Figures refers to the same or similar feature.

DETAILED DESCRIPTION

Figure 1:
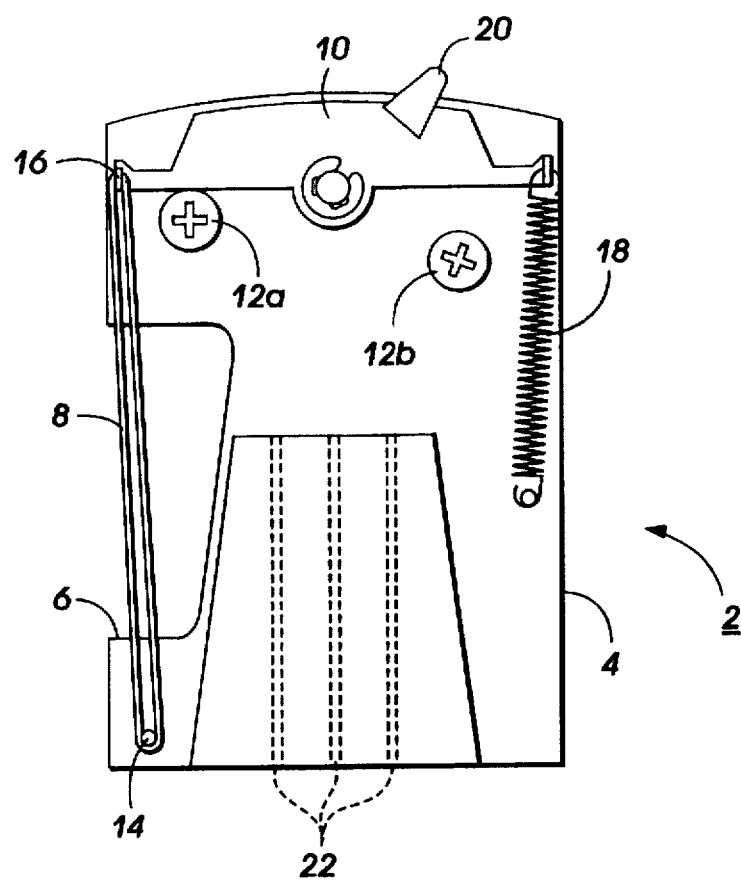
FIG. 1 represents a schematic, front view of one embodiment of the monitor apparatus at the initial position.
Figure 2:
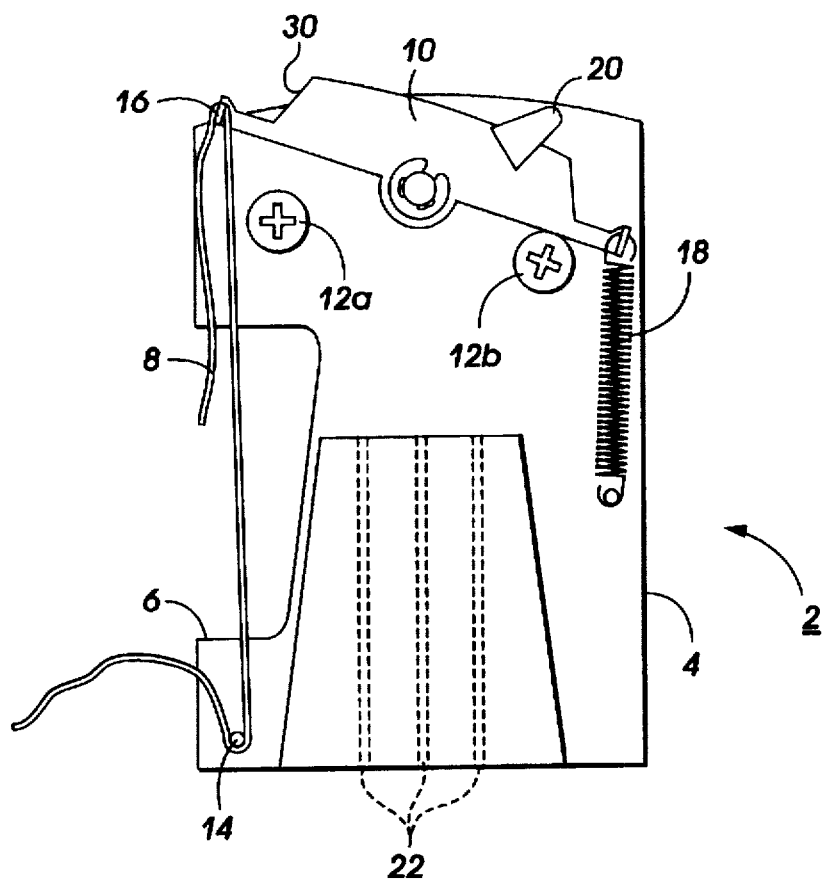
FIG. 2 represents a schematic, front view of the embodiment of FIG. 1 at the filter end life position.

In FIG. 1 and FIG. 2, the end of life monitor apparatus 2 includes a housing 4 defining an opening 6 to expose a portion of the elastic material 8 to the undesirable gas. The elastic material is in the shape of a rubber band. The indicator component 10 is coupled to the housing 4 and preferably is flat and pivots from contact with stop 12a (initial position) to contact with stop 12b (filter end life position). As seen in FIG. 1, the indicator component 10 is in the initial position indicating that the filter (not shown) has not reached its end of life yet. The elastic material 8 is coupled to the support member 14 and the indicator component 10 wherein the elastic material is stretched between the support member 14 and the hook 16 of the indicator component. Preferably, the support member 14 is stationary and is attached to the housing. The indicator component 10 is biased to move to the filter end life position by biasing device 18 which may be for example a spring as shown in FIG. 1 and FIG. 2 or a biasing disc placed underneath the indicator component. The biasing device 18 may be attached to the housing. At the initial position of the indicator component 10, marker device 20, preferably coupled to the indicator component 10, visibly extends beyond the edge of the indicator component 10 and the edge of the housing 4, thereby signaling that the filter has not reached its end of life yet. The marker device 20 can be distinctively colored to enhance visibility. The backside 30 and the edge of the indicator component 10 may be colored (preferably with a different color than that used for marker device 20) to visually indicate that the filter end life has been reached. As seen in FIG. 2, the movement of the indicator component to the filter end life position extends a portion of the indicator component 10 beyond the edge of the housing 4 and brings the colored backside 30 of the indicator component 10 into view; in addition, at the filter end life position, the marker device 20 no longer extends beyond the edge of the housing 4, thereby becoming hidden from the machine user or repair personnel. Optionally, stops (12a, 12b) may be electrically coupled to electronic signalling devices (not shown) which informs an user when the indicator component has moved to the end of life position. Where the stops (12a, 12b) are electrically coupled to electronic signalling devices, the housing may define channels 22 for the electrical wires to connect to the stops. Alternatively, in a modified version of FIG. 1 and FIG. 2, instead of a marker device 20, there are certains indications on the indicator component representing an effective filter and other indications on the indicator component representing a filter end life wherein these indications are visible to the machine user.

Figure 3:
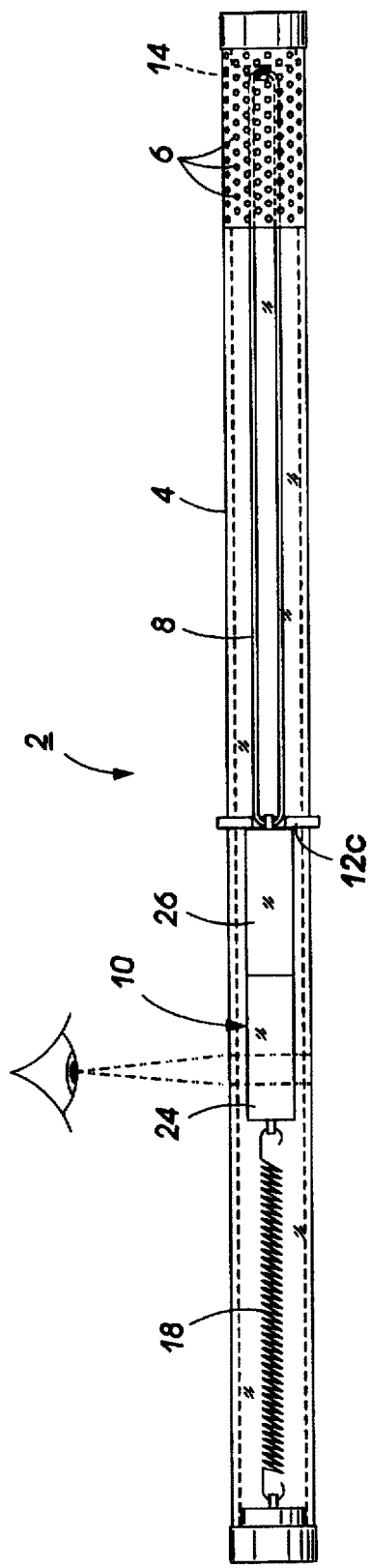
FIG. 3 represents a schematic, side view of another embodiment of the monitor apparatus.

In FIG. 3, the end of life monitor apparatus 2 includes a housing 4 defining a plurality of openings 6 (provided by a metal mesh screen) to expose a portion of the elastic material 8 to the undesirable gas. The elastic material is in the shape of a rubber band. The indicator component 10 has a first portion 24 and a second portion 26 joined together, each portion differentiated in appearance by for example a different color such that the first portion 24 represents a filter still capable of filtering out the undesirable gas and the second portion 26 represents a filter at the end of its life. The first portion 24 of the indicator component is attached to biasing device 18 such as a spring depicted in FIG. 3. The biasing device 18 is attached to the housing 4. The elastic material 8 is coupled to and stretched between the second portion 26 of the indicator component 10 and the support member 14. Preferably, the support member 14 is stationary and is attached to the housing 4. A stop 12c may be present to prevent the indicator component 10 from being moved in the direction of the support member 14 due to the tension of the elastic material. Initially, the first portion 24 is visible to the machine user. During operation, both the first portion 24 and the second portion 26 of the indicator component move towards the biasing device 18; the second portion 26 moves to the filter end life position which means the area formerly occupied by the first portion 24 since that area is visible to the user.

The monitor apparatus 2 of FIGS. 1–3 operate in a similar manner. The indicator component 10 is in the initial position which indicates that the filter still retains a useful life. After the portion of the elastic member 8 is exposed to a sufficient amount of the undesirable gas for a sufficient amount of time, the elastic material eventually becomes severed, whereby the indicator component 10 moves toward the biasing device 18 (either in a pivoting manner as in FIG. 1 and FIG. 2 or in a linear manner as in FIG. 3) by the urging of the biasing device 18 to the filter end life position. When the indicator component is in the filter end life position, the filter end life is signaled such as by the colored backside 30 of the indicator component 10 of FIG. 1 and FIG. 2 being visible to the user, an electronic signal being sent by the monitor apparatus 2 to other electronic and/or mechanical devices to visually or aurally alert the user, or the second portion 26 of the indicator component 10 of FIG. 3 being visible to the user. After the user replaces the filter, the entire filter life monitor apparatus or only the elastic material requires replacement.

In FIGS. 1–3, the indicator component 10 includes at least two position indicators as described herein that identify the position or orientation of the indicator component 10 (in determining the status of the filter) such as by different colors, numbers, letters, or other symbols. In embodiments of the present invention, the monitor apparatus can be modified to show the various stages of the life of the filter. For example, the gradual decomposition of the elastic material by exposure to the undesirable gas can result in further elongation of the elastic material wherein the movement of the indicator component in response to the further elongation by the elastic material can then reflect the stages of the filter life. For instance, in embodiments of FIG. 3, the indicator component can be modified to have more than two colors, perhaps three, four or more colors, wherein one color represents the filter end life and the other colors represents the various stages of the life of the filter.

The end of life monitor apparatus can be mounted (e.g., an adhesive, a magnet, or a coupling device like a screw or a bracket) in any suitable position in the interior or on the exterior of the machine generating the undesirable gas as long as the monitor apparatus is positioned downstream of the filter so as to be exposed to the filtered air, i.e., the air after passage through the filter. Thus, the monitor apparatus may be coupled to the filter, but this is optional since the monitor apparatus can be positioned elsewhere.

In embodiments of the present invention, the elastic material preferably has a polymeric composition such as an unstabilized hydrocarbon rubber or a natural rubber. The elastic material may be in the shape of a rubber band, a single strip, a plurality of connected strips such as two, three, or more connected strips, and the like. The desirable properties of the elastic material include a tensile strength ranging for example from about 1.0 to about 10 ounces, stretchability, and sensitivity to the undesirable gas which is manifested by decomposition. The decomposition of the elastic material to the undesirable gas can be in any suitable manner such as gradual, sudden, and discontinuous. Preferably, the decomposition of the elastic material results in the formation of stress raisers which eventually lead to the complete tearing apart of the elastic material. In embodiments, the elastic material need not become completely severed; the elastic material in the monitor apparatus may be further elongated during decomposition without a complete break. Any suitable combination of the dimensions, shape, tension, and composition of the elastic material may be employed with trial and error being one way to determine the time needed to make the indicator component move to the filter end life position. Preferably, the indicator component moves to the filter end life position at the point in time as soon as there is complete flow through of the undesirable gas (i.e., when the filter experiences complete failure), and more preferably a short period (such a few hours or days) prior to the complete flow through of the undesirable gas. Thus, the time when the indicator component moves to the filter end life position depends on the life of the filter, such filter life can vary for example from several hours or days to even the life of the machine generating the undesirable gas. The undesirable gas or gases may be corona discharge byproduct gases including for example ozone and nitrogen oxides.

In embodiments of the present invention, the support member may be a hook, a clamp, a ring, a protrusion, a threaded part, or any suitable device to retain a portion of the elastic material. The support member may be a molded part of the housing or a separate piece joined to the housing.

The present end of life monitor apparatus is preferably used in an electrostatographic printing machine, but can be used with any filter and in any machine which generates an undesirable gas.

Other modifications of the present invention may occur to those skilled in the art based upon a reading of the present disclosure and these modifications are intended to be included within the scope of the present invention.

I claim:

1. An end of life monitor apparatus for a filter that removes an undesirable gas comprising:

(a) an elastic material, which degrades in the presence of the undesirable gas;

(b) a support member coupled to the elastic material; and (c) an indicator component movable to a filter end life position, coupled to the elastic material, and the elastic material is stretched between the support member and the indicator component, wherein the indicator component is biased to move to the filter end life position but is restrained by the elastic material from moving to the filter end life position, wherein degradation of the elastic material allows the indicator component to move to the filter end life position.

2. The apparatus of claim 1, wherein the indicator component comprises at least two position indicators, wherein one position indicator represents the filter end life.

3. The apparatus of claim 1, further comprising a marker device coupled to the indicator component.

4. The apparatus of claim 1, wherein the indicator component is flat and moves by pivoting.

5. The apparatus of claim 1, wherein the elastic material degrades in the presence of the undesirable gas which is a corona discharge byproduct gas.

6. The apparatus of claim 1, wherein the elastic material is in the shape of a rubber band.

7. The apparatus of claim 1, wherein the elastic material becomes severed in the presence of the undesirable gas to allow the indicator component to move to the filter end life position.

8. The apparatus of claim 1, further comprising a spring coupled to the indicator component to provide the bias to the indicator component.

9. The apparatus of claim 1, further comprising a housing defining an opening to expose a portion of the elastic material to the undesirable gas.

10. The apparatus of claim 1, wherein the elastic material is polymeric in composition.

\* \* \* \* \*